United States Patent [19] [11] Patent Number: 4,863,189
Lindsay [45] Date of Patent: Sep. 5, 1989

[54] UNIFIED FLOOR FRAME ASSEMBLY FOR MODULAR MOBILE HOME

[75] Inventor: Fred Lindsay, Ocala, Fla.

[73] Assignee: Lindsay Industries, Inc., Seminole, Fla.

[21] Appl. No.: 142,554

[22] Filed: Jan. 11, 1988

[51] Int. Cl.$^4$ .............................................. B62D 21/02
[52] U.S. Cl. ...................... 280/789; 52/648; 52/693; 296/181; 296/182; 296/204
[58] Field of Search ............... 280/785, 789, 781, 798, 280/799; 52/664, 666, 690, 143, 642, 643, 693, 648; 296/181, 182, 204

[56] References Cited

U.S. PATENT DOCUMENTS

| | | | |
|---|---|---|---|
| 2,861,811 | 11/1958 | Lassen | 280/789 |
| 3,716,267 | 2/1973 | Lindsay | 296/168 |
| 4,015,375 | 4/1977 | Lindsay | 296/182 |
| 4,019,299 | 4/1977 | Lindsay | 52/648 |
| 4,106,258 | 8/1978 | Lindsay | 52/693 |
| 4,358,134 | 11/1982 | Scully | 280/789 |
| 4,570,967 | 2/1986 | Allnutt | 280/789 |
| 4,662,650 | 5/1987 | Angehrn et al. | 280/789 |

Primary Examiner—Richard A. Bertsch
Attorney, Agent, or Firm—Lowe, Price, LeBlanc, Becker & Shur

[57] ABSTRACT

A floor frame assembly, formed principally of wood material, has two load-bearing outer beams and front and rear end members defining a periphery and a plurality of transverse load-supporting trusses connected normal to the outer beam between the end members. In a preferred embodiment, each truss has an upper elongate member, a shorter central elongate member attached parallel thereto by vertical cross-braced elements, and on either side of the central member a braced vertical member spaced therefrom to provide gaps of predetermined height and width. Each truss also has an end portion of the upper elongate member in cantilever form for contact thereat with a load-supporting surface at the permanent location of the floor assembly, so that additional external beams or continuous wall surfaces to support the completed floor frame assembly and any superstructure thereon is rendered unnecessary. The floor frame assembly may be further supported by conventional piers or jackposts at points under two elongate, load-supporting, inner beams closely received and connected to the trusses within the gaps. These inner beams may optionally be made of wood material, wood material supported along the edges at selected portions by metal reinforcement, or entirely formed of I-section beam lengths. In one aspect of the invention, at least one of the load-supporting outer beams has a larger vertical dimension than the other outer beam and two floor frame assemblies thus formed may be united at their respective wider outer beams and provided additional support thereunder to generate a commensurately larger floor frame assembly structure.

48 Claims, 9 Drawing Sheets

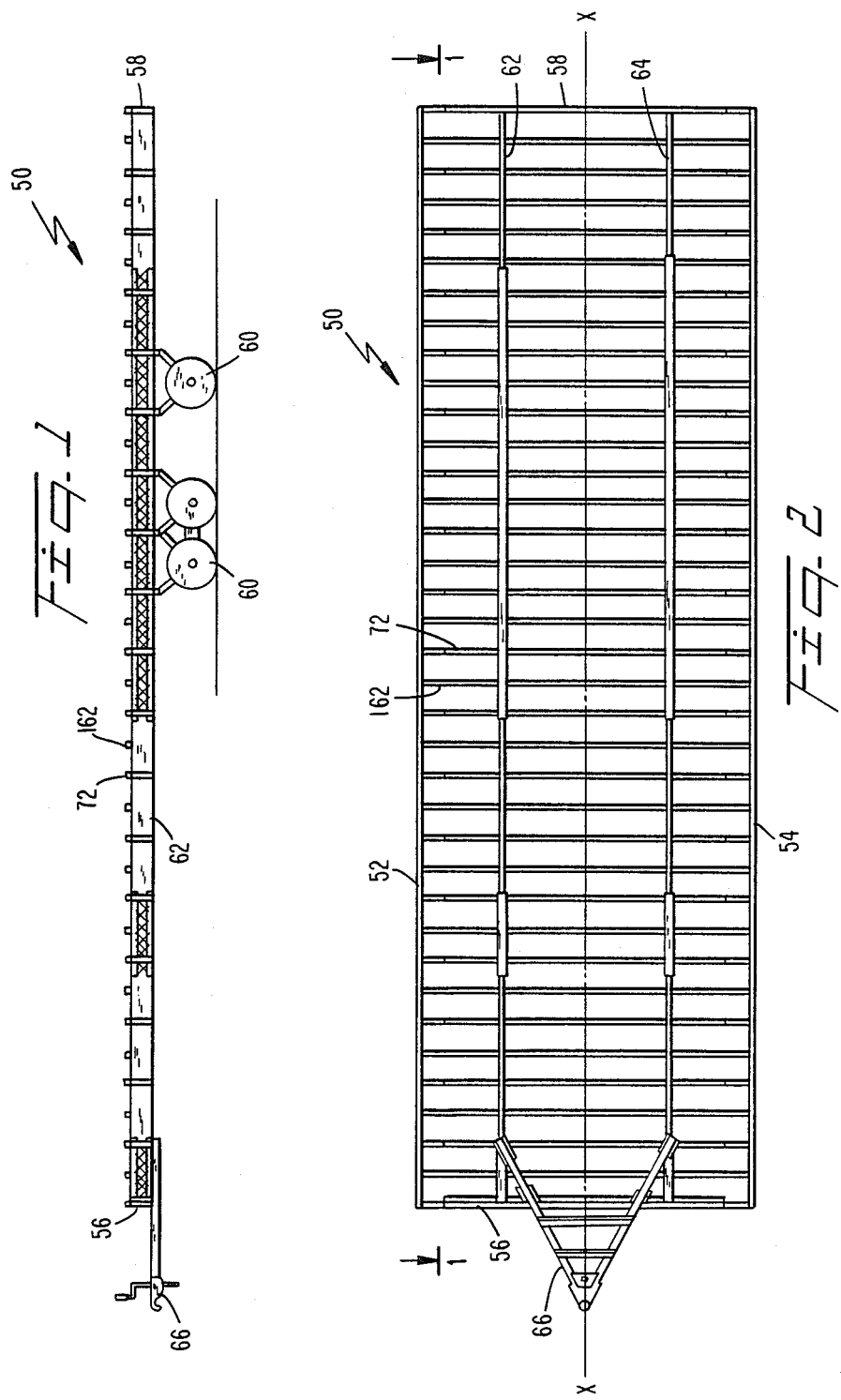

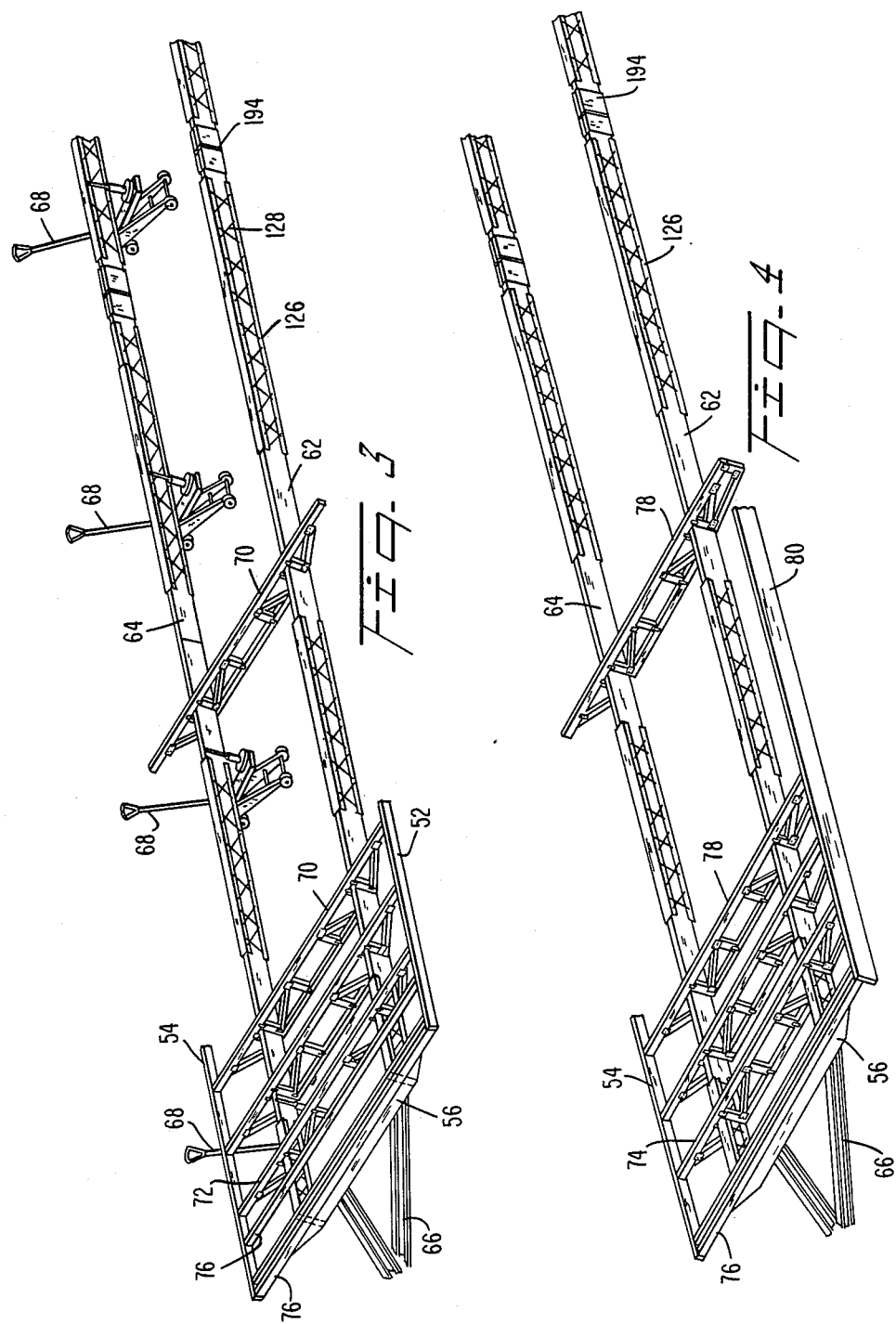

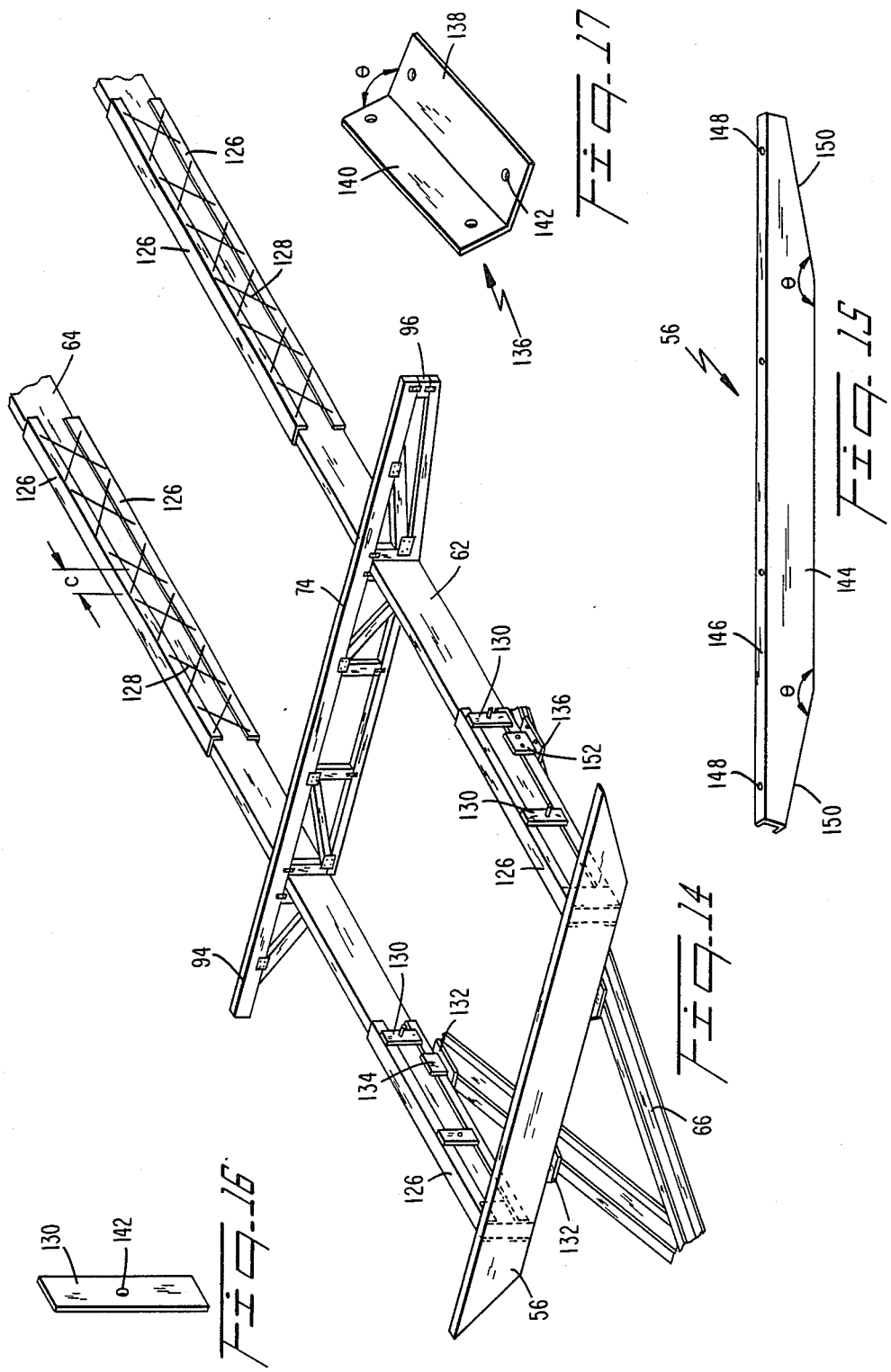

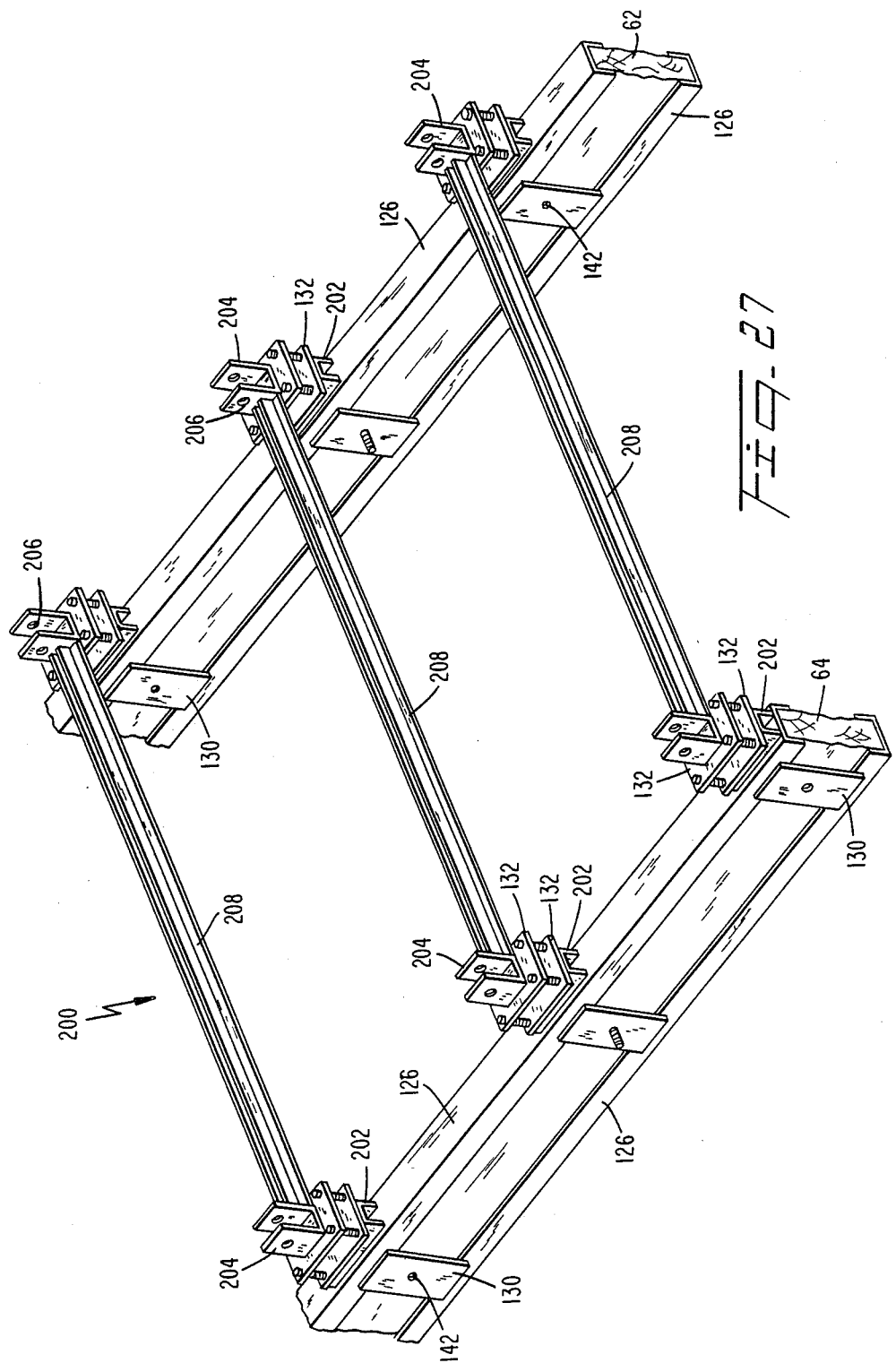

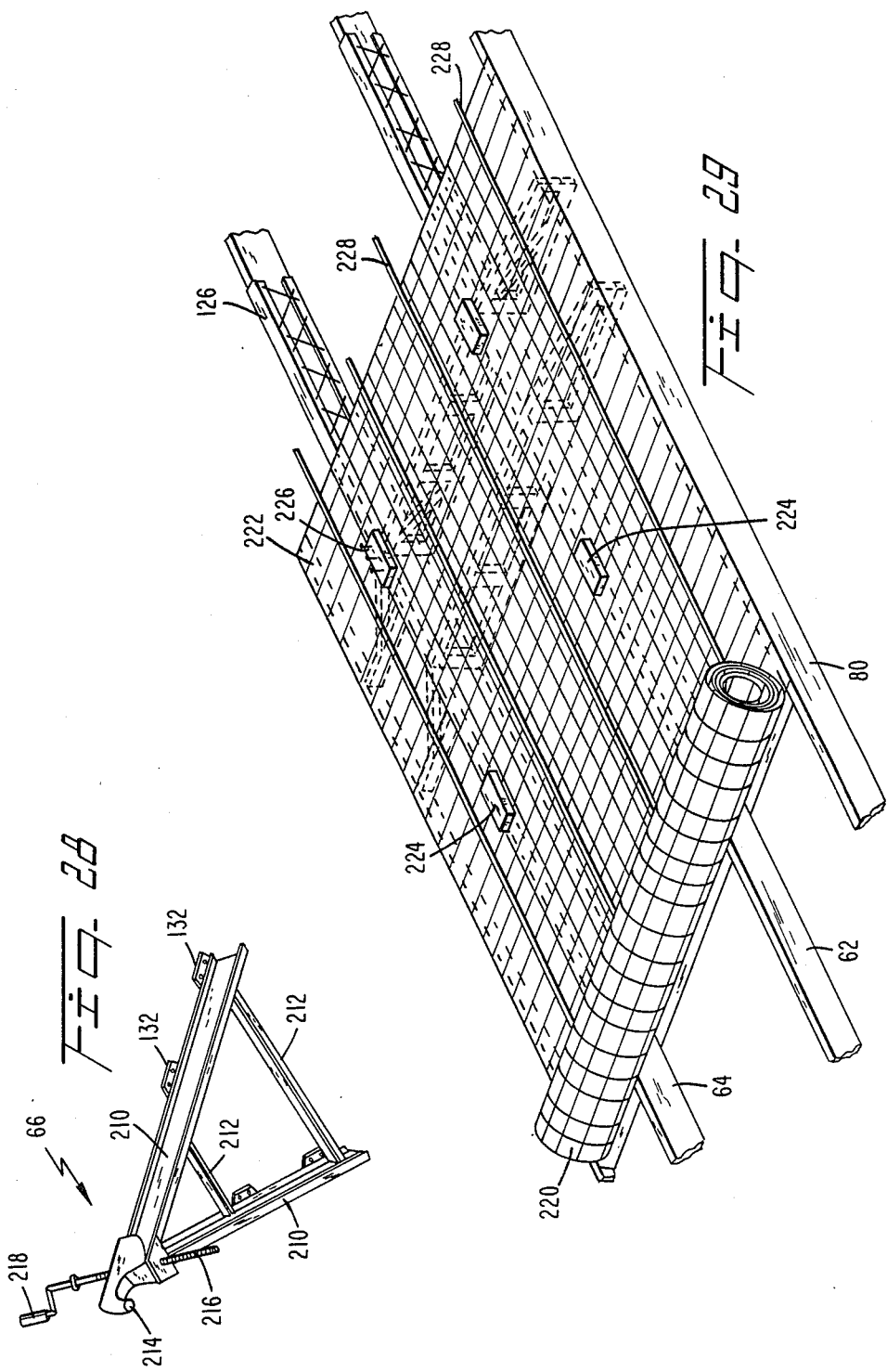

UNIFIED FLOOR FRAME ASSEMBLY FOR MODULAR MOBILE HOME

FIELD OF THE INVENTION

This invention relates generally to floor frame assemblies suitable for mobile homes and, more particularly, to a modular unified mobile home floor frame assembly that is supportable at a permanent location in a safe and stable manner either for a single mobile home unit or, by the combination of two modular floor frame assemblies, to provide a floor for a large superstructure thereon.

BACKGROUND OF THE INVENTION

Traditional building methods have become increasingly expensive and, consequently, in many parts of this country perspective homeowners often find it more desirable to live in mobile homes that are assembled in whole or in part at a manufacturing facility and then towed to a permanent location. Such mobile homes typically have a substantially rectangular floor that is most conveniently supported either around its periphery and/or at points underneath and within the periphery. The floor frame assembly may be assembled complete with walls, roof, windows and doors and similar superstructure items or may be towed to the permanent location for coupling of two or more such floor assemblies to create a larger floor area for a commensurately larger superstructure to be built thereon.

Every jurisdiction has local codes for mobile homes and manufacturers thereof, therefore, design mobile homes accordingly. Of particular interest to individual buyers are factors such as safety against fire hazards and physical stability of the mobile home under high wind conditions. In addition to satisfying such concerns, as persons skilled in the art will appreciate, the prefabricated structure must be transported in a safe and stable manner at highway speeds from its point of manufacture to its permanent location. During such transportation, the structure must be capable of withstanding exposure to incidental bouncing and shock loading with significant deleterious effects.

Satisfaction of the fire code requirements in most jurisdictions favors the use of as much wood or wood products as possible in the floor frame assembly because steel beams have a tendency to warp when exposed to heat from flames and this causes major problems and increased damage. However, for certain applications, e.g., when for asthetic or practical reasons support must be provided other than at the periphery of the mobile home floor, the balance of interests favors the inclusion of I-section steel beams within the floor frame assembly. As a matter of manufacturing practicality and in order to provide the consumer a choice of options, it is therefore highly desirable to provide a mobile home floor frame assembly with the optional replacement of inner wooden beams by I-section steel beams.

Furthermore, as persons skilled in the art will appreciate, it is highly desirable to design the structure so that it is transportable to its permanent destination safely and allows detachment therefrom for reuse of the wheel assembly and towing hitch assembly that must be used during transportation.

Although considerable work has been done in the general field of this invention in meeting the needs outlined hereinabove as, for example, exemplified in my own patents, U.S. Pat. Nos. 3,716,267, 4,015,375, 4,106,258 and 4,019,299, all of which are incorporated herein by reference, there still exists a need for an improved towable unified floor frame assembly for a mobile home that is easily and safely transportable to its ultimate destination, provides the optional inclusion of load-supporting steel beams and from which the wheel assembly and towing hitch elements can thereafter be readily detached and retrieved for reuse.

DISCLOSURE OF THE INVENTION

Accordingly, it is a principal object of this invention to provide a modular mobile home unified floor frame assembly that can be prefabricated, with or without superstructure, and can be thereafter towed in a safe and stable manner to its permanent destination.

It is another object of this invention to provide a safely towable mobile home unified floor frame assembly that can be prefabricated, with or without superstructure, to fully satisfy the applicable mobile home code.

It is yet another object of this invention to provide a mobile home unified floor frame assembly that can be transported in a safe and stable manner on a wheel assembly by means of a towing hitch, both the wheel assembly and the towing hitch being readily detachable following delivery of the floor frame assembly to its destination.

It is yet another object of this invention to provide a mobile home unified floor frame assembly that is optionally at least 90 percent by weight constituted of wood or wood products, exclusive of detachable wheels and a towing hitch utilized during transportation of the floor assembly to a permanent destination.

It is a related additional object of this invention to provide a mobile home unified floor frame assembly that optionally includes longitudinally disposed load-supporting steel beams that remain integral therewith, detachable wheels and a towing hitch utilized during transportation of the floor assembly to a permanent location being removable therefrom for reuse.

It is an even further object of this invention to provide a readily towable mobile home unified floor frame assembly that is prefabricated with a sheet-like layer disposed substantially over the lower expanse thereof to exclude from the floor frame assembly moisture, dirt, insects and pests.

It is yet another object of this invention to provide a readily and safely towable mobile home unified floor frame assembly that can be prefabricated with or without a superstructure, has a moisture, dirt, insect and pest excluding sheet-like layer extending across its lower expanse and has elements of heating and ventilating ducting, and/or wiring installed during assembly and manufacture.

Yet another object of this invention is to provide a unified mobile home floor frame assembly having a length in excess of sixty feet, suitable for combining with another similar floor frame assembly, that can be transported after prefabrication with or without a superstructure, in which principal elongate lengthwise disposed outer load supporting beams are formed with a camber and reinforced in the vertical plane to counter and compensate for incidental loads experienced by the floor frame assembly during its transportation from a point of manufacture to its permanent destination.

These and other objects of the present invention are realized by providing a preferred embodiment thereof first and second elongate load-supporting outer beams parallel to a longitudinal axis of the floor frame assembly, front and rear end members connected normal thereto and thus defining a floor perimeter, and a plurality of transverse trusses between the end members and connected normal to the outer beams. In the preferred embodiment the trusses each include an upper elongate member and a central lower elongate member separated in parallel therefrom by a plurality of vertical members and cross bracing elements, and two additional braced vertical members separated from the central member by vertical gaps of predetermined height and width, with at least one end portion of the upper elongate member having a cantilever form for supporting contact thereat at a permanent location. A pair of inner load-supporting beams parallel to the axis are closely received into the truss gaps and securely connected thereto as well as to the end members by suitable connector means. A floor is connected atop the trusses and the outer perimeter and wheels and a towing hitch are temporarily attachable under the floor frame assembly for transportation.

In another aspect of the invention, one of the load-supporting outer beams has a larger vertical dimension and the truss ends connecting thereto are modified for secure connection thereat. This embodiment affords the user the option of connecting two such floor frame assemblies at their larger outer beams and providing extra support thereunder.

In yet another embodiment the inner elongate beams are formed of I-section steel instead of wood or wood reinforced along the beam edges by C-section steel lengths.

Still other objects and advantages of the present invention will become readily apparent to those skilled in this art from the following detailed description wherein only the preferred embodiments of the invention are shown and described, simply by way of illustration of the best mode for practicing different aspects of the invention. As will be realized, the invention is capable of other and different embodiments, and its several details are capable of modifications in various obvious respects, all without departing from the invention. Accordingly, the drawing and description hereof are to be regarded only as illustrative in nature and not as restrictive.

BRIEF DESCRIPTION OF THE DRAWINGS

FIG. 1 is a longitudinal sectional view of the unified mobile home floor frame assembly according to a preferred embodiment of this invention, supported on a plurality of wheels and a forwardly attached towing hitch.

FIG. 2 is a plan view of the underside of the unified floor frame assembly of the embodiment of FIG. 1, with the interior structure exposed.

FIG. 3 is a partial perspective view, during an intermediate stage of its assembly, of the unified mobile home floor frame assembly of FIG. 2, in a version including interior load supporting wooden beams and suitable for support at points along its periphery.

FIG. 4 is a perspective view of a variation of the embodiment of FIG. 3, wherein one of the longitudinal outer wooden beams is wider than its opposite parallel counterpart and is suitable for coupling thereat to a matching floor frame assembly for common support at their longitudinal junction.

FIG. 14 is a partial perspective view illustrating details of the front end structure of a preferred embodiment of the invention.

FIG. 15 is a perspective view of a metal end member according to this invention.

FIGS. 16–19 are perspective illustrations of typical metal elements utilized in the assembly of the various embodiments of this invention.

FIG. 27 is a perspective view of a portion of the structure for coupling load-bearing wheels and axles to steel reinforced interior wooden load-supporting beams in the structure formed according to this invention.

FIG. 28 is a perspective view of a towing hitch temporarily attachable to a front end of the floor frame assembly for applying a towing force to the same.

FIG. 29 is a perspective illustration of the manner in which a thin sheet-like covering is applied to the underside of the loading supporting beams to exclude moisture, dirt, insects and pests from the floor frame assembly according to this invention.

DESCRIPTION OF THE PREFERRED EMBODIMENTS

Figure 5:
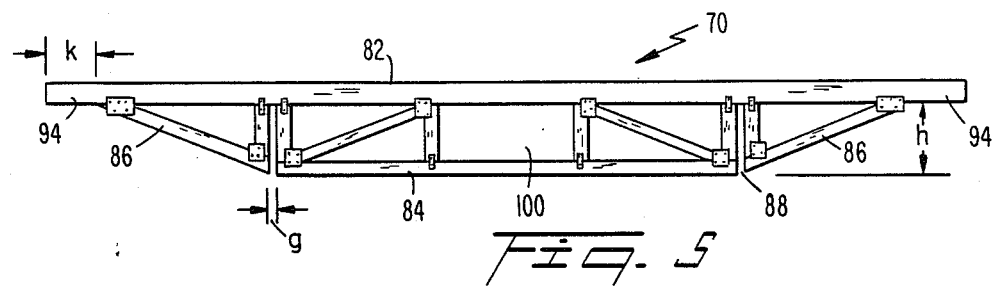
FIGS. 5, 6 and 7 illustrate typical transverse trusses suitable for use in various embodiments of the invention.

As best understood with reference to FIGS. 1 and 2, a typical unified mobile home floor frame assembly 50 has a generally rectangular form in plan view, typically symmetric about a longitudinal axis X—X. The perimeter of the floor frame assembly is defined by two longitudinally oriented load-bearing outer beams 52 and 54 connected normally at their respective front and rear ends to transverse end members 56 and 58. At intermediate points between the front and rear end members, for transporting the floor frame assembly 50 from its point of manufacture to its ultimate destination, is provided a plurality of road contacting and load-supporting wheels 60 attachable under the floor frame assembly by known means. In the preferred embodiment of this invention are also provided two longitudinally disposed interior load bearing beams 62 and 64, preferably disposed symmetrically about axis X—X and connected at their respective ends to front and rear end members 56 and 58. Also connected during transportation of the floor frame assembly is a towing hitch 66, attachable as described more fully hereinbelow to a front lower portion of the floor frame assembly. The application of a towing force to towing hitch 66 enables transportation of the floor frame assembly supported by wheels 60, together with any superstructure, e.g., floor, carpeting, walls, roof, doors and windows and the like, along highways.

Following delivery of the floor frame assembly to its intended destination, and upon provision of adequate support therefor with respect to the ground, the detachable wheels 60 and associated attaching elements as well as the towing hitch 66 are detached from the floor frame assembly 50 for reuse.

FIG. 3 illustrates a partially assembled floor frame prior to the mounting thereon of a floor and the like for a preferred embodiment of this invention. Other embodiments of the invention, each offering optional advantages to meet particularized needs, are discussed more fully hereinbelow and are claimed specifically.

In the preferred embodiment illustrated in FIG. 3, longitudinally oriented load-bearing outer beams 52 and 54 have substantially rectangular cross-sectional areas normal to their respective lengths and are oriented with the longer side of the rectangular cross-section vertical to obtain maximum stiffness therefrom. Rearwardly from front end members 56 is disposed a plurality of load-supporting trusses, typified by trusses 70 and 72 attached at predetermined distances apart to load-bearing outer beams 52 and 54 as well as to load bearing inner beams 62 and 64.

A typical separation between the end members and/or adjacent trusses, between centers, is 24 inches. This facilitates the mounting, atop the trusses and the load bearing beams, of plywood flooring (not shown for simplicity) in widths of four feet and lengths corresponding to the transverse dimension of the finished floor frame assembly 50. However, when it is anticipated that there will be relatively high loading on the floor, e.g., when such a structure is utilized where heavy file cabinets and the like may be contained within the mobile home, it may be preferably to provide additional support for the flooring by interspersing lengths of 2"×4" wooden studs 76 between the end members and/or adjacent trusses so that relative separation between adjacent elements supporting the floor is 16", for example. Any such supplemental strengthening of the basic structure as taught herein is commensurate with the broad overall aims of the present invention, i.e., to provide a unified, relatively light, rigid and very strong structure that can be supported at points around its periphery underneath the outer load-bearing beams and end members and also by conventional piers, jackposts or the like at points underneath the load-bearing inner beams.

It will be appreciated that the structure illustrated in FIG. 3 is intended to be substantially symmetrical about a longitudinal axis thereof. In a first alternative embodiment, where it is contemplated that two such floor frame assemblies will be connected together to provide a single expanse of floor extending the full length of each of the component floor frame assemblies and having a width equal to double the width of either one of them, the structure as illustrated in FIG. 4 is particularly advantageous. In this embodiment, longitudinally oriented load-supporting outer beam 52 is replaced by an equally long outer beam 80 that has a larger cross-sectional area by virtue of having a larger dimension in the vertical direction as illustrated. Such a load-supporting inner beam 80 is utilized with a somewhat modified form of transverse truss, this being truss 78 illustrated in greater detail in FIG. 7.

The principal differences between the embodiments illustrated in FIGS. 3 and 4, therefore, are the different truss utilized (78 instead of 70) and load-supporting outer beam 80 being substantially larger in the vertical dimension than its counterpart load-supporting outer beam 54. Typically, beam 80 may be twice as large in the vertical dimension as beam 54. In all other significant respects, the structures according to the embodiments illustrated in FIGS. 3 and 4 are essentially similar.

Persons skilled in the art will appreciate that where two structures like those of the embodiment of FIG. 4 are to be connected at their respective wide load-supporting outer beams 80, each, in effect, must be the mirror image of the other so that their individual beams 80 can be placed adjacent to each other and fastened by bolts or nails driven through both in any conventional manner. The superstructure resting on two so coupled floor frame assemblies may have walls along the periphery of the combination and also, as desired, over the junction of their two load bearing beams 80 or elsewhere.

The various options available to the ultimate user of such floor assemblies, in terms of safely and stably supporting the same in advantageous manner not previously available, are discussed in greater detail hereinafter.

Figure 13:
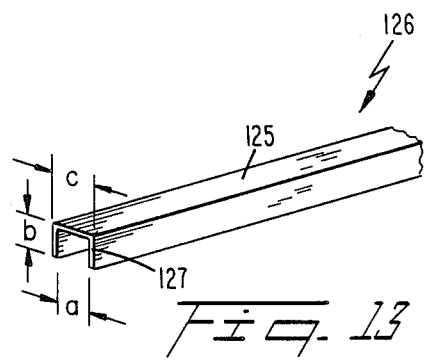
FIG. 13 is a partial perspective view of a C-section length of steel suitable for providing longitudinal reinforcement to interior wooden beams in the invention.

At this stage, however, it is useful to note that if long, conventional, wood veneer composition beams 62 and 64 are employed as load-supporting inner beams, and if the overall length of the structure is significant, say thirty feet or greater, it is highly desirable to provide longitudinal reinforcement to the inner beams. This is most readily effected, according to this invention, by positioning lengths of C-section steel, as best seen in FIG. 13, generically identified as 126, having a base 125 with an internal transverse dimension "a", and two lateral arms 127, both normal thereto and extending to a distance "b" from the outer surface of base 125. The outer surface of base 125 has a width "c". Dimension "a" should be very close to but slightly larger than the thickness of the typical interior load supporting beams 62 or 64 that is to be reinforced by C-section lengths 126, as best understood with reference to FIGS. 3 and 4. In practice, the reinforcement within contained beams 62 and 64 is provided by positioning two parallel lengths of C-section channel 126 on opposite sides of the beam to closely fit thereto and, thereafter, welding between the two C-section channels 126 diagonal lengths of steel rod 128 in a criss-cross pattern that firmly affixes the C-section channels 126 to the within contained wood beam 62 or 64 and makes the reinforcing structure rigid. This is best seen in FIGS. 3 and 4.

Persons skilled in the art will immediately appreciate that depending on where such C-section channels 126 are used to reinforce the interior load supporting beams 62 and 64, it may be necessary to select trusses transverse thereto in accordance with the lateral dimension of the beam (reinforced or otherwise) that must be received within and affixed within their respective gaps.

Referring now to FIG. 5, it is seen that a first type of transverse truss 70 has a top elongate wooden piece 82 that in use will be symmetrically disposed about and normal to the longitudinal axis X—X. To this upper piece 82 are attached, starting from each end, downwardly inclined elements 86 braced at their respective ends by vertical pieces (not numbered) attached in any conventional manner. Between the inward ends of inclined pieces 86 is a greatly rectangular crossbraced structure, the lowest portion of which is defined by a horizontal piece 84 of a length and disposed such that a vertically oriented rectangular gap 88 is created adjacent each of the ends of inclined pieces 86, these gaps having a horizontal transverse dimension "g". The central generally rectangular structure has formed therewithin a generally rectangular centrally located aperture 100 for reasons discussed hereinafter. Basically, therefore, a truss such as truss 70 is formed so as to have two end portions 94, each of a length "k" and a distance between the lowest point of horizontal piece 84 and the lower surface of top piece 82 defined as "h". When such a truss is used to assemble a structure such as that illustrated in FIG. 3, the load-supporting outer beams 52 will be nailed to the end vertical surfaces of piece 82 of truss 70 and the load-bearing inner beams 62 and 64 will closely fit within and be received inside gaps 88. For proper compact assembly, therefore, gap "g" will be selected to be very close to but slightly larger than the thickness of load-supporting inner beams 62 and 64 to be received therewithin and the distance "h" will be selected to be very close to but not seriously in excess of the vertical cross-sectional dimension of interior load supporting beams 62 and 64.

Figure 6:
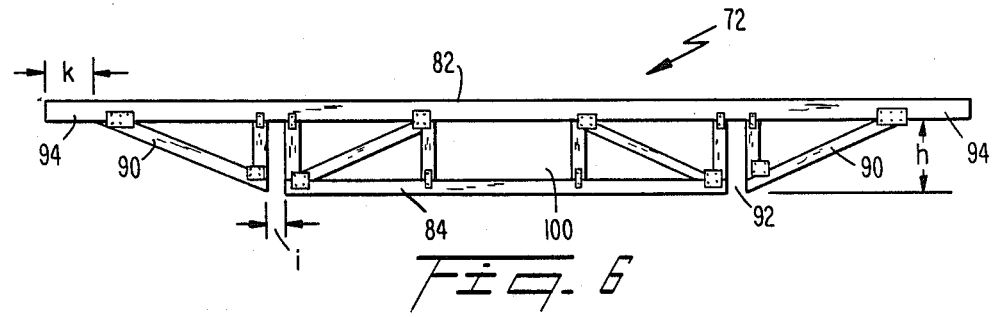

As previously indicated, circumstances may require the provision of C-section channel reinforcement pieces 126 along portions of the lengths of interior load supporting beams 62 and 64, as indicated in FIGS. 3 and 4. In such a case, because of the thickness of the material of the C-section channel 126, it will be necessary to provide truss 72, best seen in FIG. 6, that differs from the truss 70 of FIG. 5 principally in that gaps 92 of a width "i" are wider than gaps 88 of width "g" of truss 70 and slightly larger than the width "c" of C-section reinforcement lengths 126. To compensate for this change, inclined pieces 90 of truss 72 are dimensioned to be slightly smaller than counterpart inclined pieces 86 of truss 70. Typically, the aperture 100 should be similar for both trusses 70 and 72, and, likewise, the dimension of lower horizontal portion 94 of the top horizontal piece 82 in both trusses 70 and 72 is "k". A very convenient way to support the completed floor frame assembly at its permanent location is to rest portions 94 (and attached load-bearing outer beams) on upper surfaces of cinder blocks, short lengths of wall or the like without the need for any additional load-distributing beams as are required with conventional floor frame assemblies. Such a truss 72 would be utilized with the embodiment of FIG. 3 in regions where reinforcement C-section channels 126 are employed to reinforce load-supporting inner beams 62 and 64.

Figure 7:
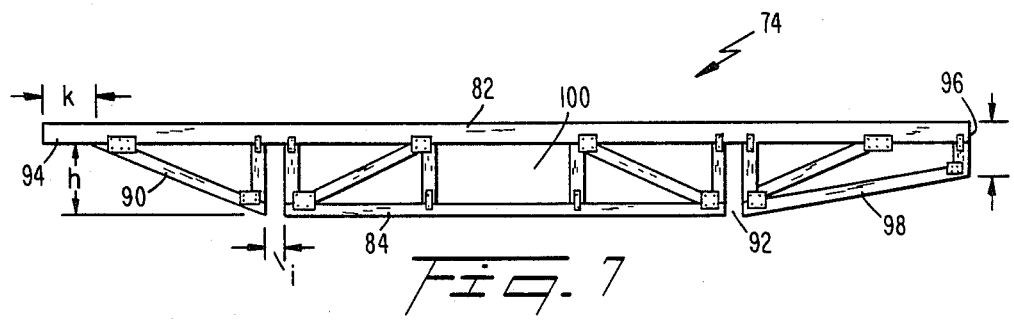

As indicated previously, the embodiment of FIG. 4 differs from that of FIG. 3 in that at least one of the load-supporting outer beams 80 has a larger vertical dimension than that of, for example, load-supporting outer beams 52 and 54 of the embodiment of FIG. 3. For such a structure, particularly in regions where steel C-section channel reinforcement 126 is provided to the load-supporting inner beams 62 and 64, a truss such as truss 70 of FIG. 7 is particularly appropriate for use. Truss 74 differs from truss 72 in that at one end it has a vertical downwardly depending element 96 connected at one end of horizontal top piece 82 and extending to and connected to a second inclined piece 98 connected to inclined piece 90 at its lowest end. By this arrangement, a vertical wooden face of depth "j" is formed at one end of truss 74 for the affixation thereto, by any conventional means such as nails or screws, of the relatively wide outer load supporting beam 80 of FIG. 4. The typical gap 92 in truss 74 can be selected to be either of width "g" (to accommodate only the thickness of interior load supporting beam 62 or 64) or a width "i" (to accommodate the somewhat wider thickness of C-section channels 126 reinforcing such an interior load supporting beam 62 or 64). A truss 78 comparable to truss 74 but with gaps of narrower width "g" to receive unreinforced inner beams 62 and 64 is illustrated in FIG. 4.

As will now be apparent to persons skilled in the art, by judicious deployment of trusses 70, 72 and straight 2"×4" lengths 76 properly connected to load-bearing outer beams 52 and 54 and load-bearing inner beams 62 and 64 (all per FIG. 3), one can assemble a structure that can be supported underneath lengths 94 of trusses 70 and 72 as desired and necessary to support the full weight of the floor frame assembly and any superstructure and contents of the mobile home.

It should be appreciated that the load-supporting outer beams 52 and 54 are strongly nailed into the vertical ends of trusses 70 and 72 as appropriate and that load-supporting inner beams 62 and 64, received within gaps 88 or 82 as appropriate, must be very strongly affixed to the trusses (as described more fully hereinbelow). In essence, the same comments apply to the manner of using truss 74 or 78 in the structure illustrated in FIG. 4. Although it is believed that the structure constituted principally of wood beams and trusses best satisfies prevailing mobile home codes, there may arise circumstances when it may be preferable to obtain greater strength in the load-supporting inner beams by utilizing, for example, an I-section steel beam of horizontal width "i" and vertical dimension "h" such as beam 102, best seen in FIGS. 10, 8 and 11.

Figure 8:
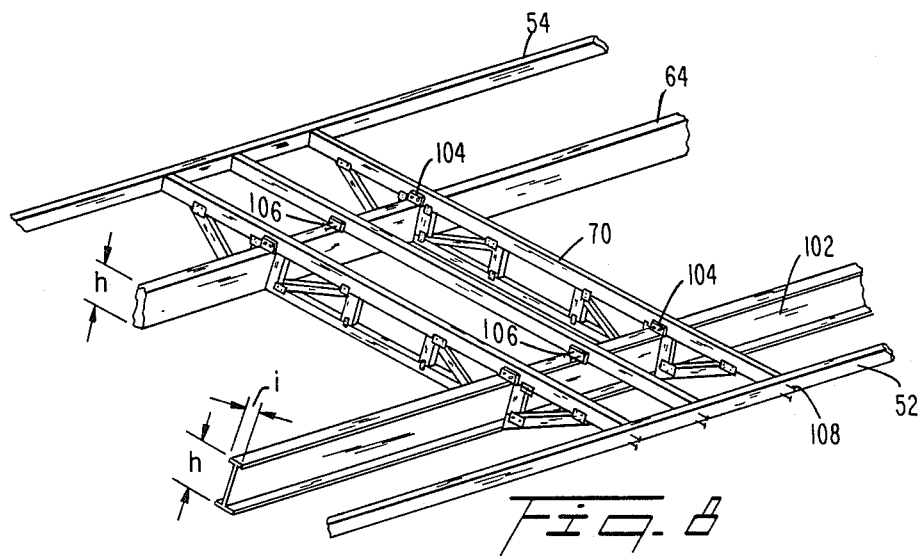
FIG. 8 is a partial perspective view of a segment of a preferred embodiment of the invention, specifically to illustrate the optional manner in which the interior beams may be selected of wood or steel I-section.
Figure 10:
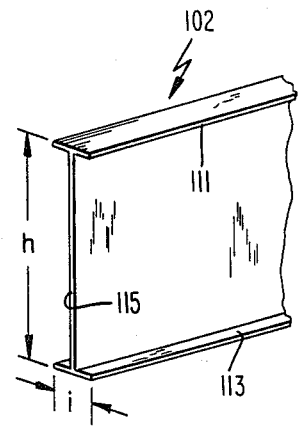
FIG. 10 is a partial perspective view of a typical steel I-beam suitable for use as an interior load supporting beam in the present invention.
Figure 11:
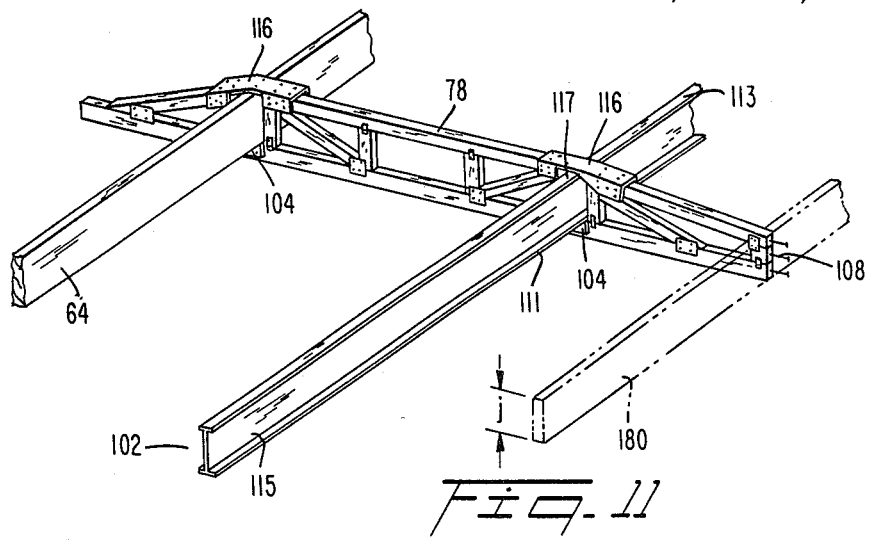
FIG. 11 is a partial perspective view in a direction opposite to that of FIG. 8 to illustrate a preferred manner of permanently connecting either wooden or steel I-section interior load-supporting beams to trusses within the floor frame assembly.

In FIGS. 8 and 11, purely for illustration purposes and for improved understanding of the options available, one of the interior load supporting beams is shown as steel I-section beam 102 and the other as rectangular section wooden beam 64. I-section beam 102, as best seen in FIG. 10, has a vertical web 115 and horizontal top and bottom flanges 111 and 113, respectively. When I-section beam 102 is sized according to the illustration of FIG. 10, it can be received comfortably in either of trusses 72 and 74, as appropriate, to produce the type of structures partially illustrated in FIGS. 8 and 11.

Figure 9:
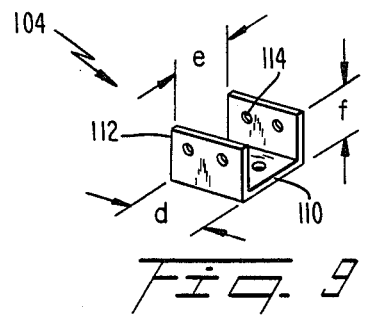
FIG. 9 is a perspective view of a bracket suitable for connecting a transverse truss to an interior beam.

Persons skilled in the art, upon understanding FIGS. 8 and 11, will appreciate that when load-supporting inner beams 64 are utilized with trusses such as 70 and 72, connection of these beams with the trusses is facilitated and made more secure by the employment of C-section brackets 104, best seen in FIG. 9. Each such bracket 104 is typically made of steel and has a base 110 of a length "d" and an inside width "e" and, extending therefrom on either side, two parallel sections 112 and 114, each of height "f". Each of the segments 110, 112 and 114 is provided with a plurality of small apertures through which nails or screws may be driven as desired. The material of such brackets for connecting the transverse trusses to the interior load supporting beams should be such that it may be welded when the option to utilize steel I-section beam 102 instead of wooden beam 64 is exercised. In short, when load-supporting inner beams are made of wood, e.g., 62 and 64, truss and beam connecting bracket 104 could be nailed at face 110 to the upper horizontal surface of the load-supporting beam and would receive a portion of the top piece 82 above the gap 88 if truss 70 is used or gap 92 if truss 72 or 74 is used. This is best understood with reference to FIG. 8. If steel I-section beam 102 is used as a load-supporting inner beam, face 110 of truss and beam connecting bracket 104 is preferably welded to upper horizontal expanse 111 of I-beam 102. Nails, screws or bolts are then driven through apertures 114 of bracket 104 to affix upper piece 82 of the truss thereat. This procedure essentially ensures strong permanent connection between transverse trusses and the load-supporting inner beams. Similarly, as seen from FIGS. 8 and 11, load-supporting outer beams 52 or 80 will be respectively nailed-in by nails 108 to the outermost faces of the transverse trusses.

Figure 12:
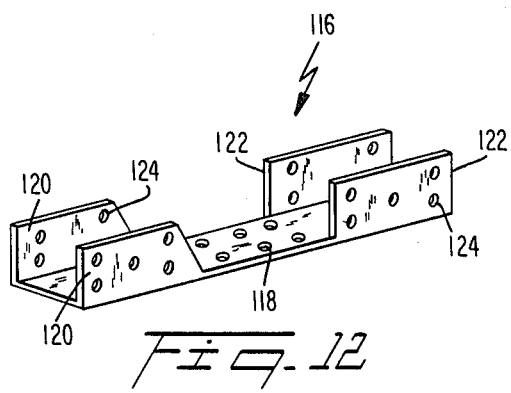
FIG. 12 is a perspective view of a truss and beam coupling element.

Referring now to FIGS. 11 and 12, it is seen that on the other side, i.e., the bottom of the floor frame assembly, traditional affixation between the transverse truss and the load-supporting inner beam 64 (if made of wood) or 102 (if made of I-section steel) is best effected by employing a second type of truss to beam connecting bracket 116 that has a relatively long flat base 118, and normal thereto on each side, shorter extensions 120 and 122, with a plurality of apertures 120 provided through all surfaces.

It will be noted that lateral extensions 120 differ from lateral extensions 122 in bracket 116 in that the former are trimmed so that their internal sides are inclined at an angle less than 90° to the base 118 to fit the truss inclined elements better. As best understood from FIG. 11, if the load-supporting inner beam is beam 64 made of wood, base 118 of bracket 116 is simply nailed or screwed onto the lower portions of the transverse truss and beam 64. Thus, brackets 104 and 116 combine to firmly and permanently connect the typical transverse truss to a load-supporting inner beam. In a logical modification of this practice where the load-supporting inner beam 102 is made of steel, the central flat portion of bracket 116 is welded to horizontal lower face 113 of I-beam 102 but is nailed to wooden portions of the transverse truss 78. Weld beads 117 and additional weld material through apertures 118 in the flat central portion of bracket 116 generally should be sufficient for such attachment.

FIG. 14 illustrates a preferred type of reinforcement provided at the front end of inner load supporting beams 62 and 64 in a structure of the type illustrated in FIG. 4. Essentially, this employs selected lengths of C-section channel 126 disposed along the top and the bottom at the end of beams 62 and 64, these lengths 126 on each individual beam being further connected by welding to essentially flat rectangular wheel pieces 130, each provided preferably with a central bolt hole 142, as best seen in FIG. 16, for the passing therethrough of a bolt (through holes drilled through the wooden beam 62 and 64 at appropriate locations for that purpose) to firmly connect reinforcement structure constituted of C-section lengths 126 and vertically disposed pieces 130 to each beam.

The heavy gauge sheet metal front end element 56, best seen in FIG. 15, has a vertically disposed front face 144 and normal thereto a horizontal upper face 146 provided with apertures 148. The lower portion of front end piece 56 is formed to have, adjacent each end, inclined faces 150 forming obtuse angles "$\theta$", to the horizontal.

Figure 18:
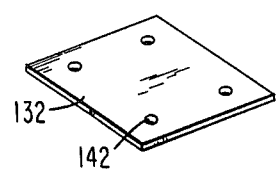
Figure 19:
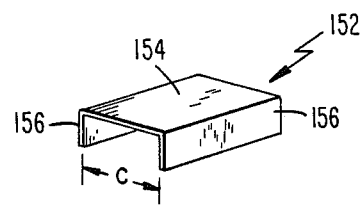

To the horizontal lower portion of front end piece 56, at suitable locations, are welded flat rectangular bolting elements 132, best seen in FIG. 18, each provided with a plurality of apertures 142. Underneath the lower C-section elements 126 connected to the front ends of inner load supporting beam 62 and 64 are welded C-section brackets 152, best seen in FIG. 19, each having an internal width at least equal to "c", i.e., sufficiently wide to accommodate comfortably therewithin a C-section channel piece 126. Brackets 152 have a flat base 154 and normal thereto side extensions 156. On each side, a bracket 152 is welded with sides 156 upward, as appropriate, to a length of lower C-section channel 126 accommodating the bottom lengths of beams 62 and 64. Underneath C-section brackets 152 are attached short lengths of V-section connecting elements 136 formed of two flat sections 138 and 140 inclined with respect to each other to subtend an obtuse angle "$\theta$". A plurality of apertures 142, similar to those in flat element 130, are provided in the V-section connecting element 136.

V-section elements 136 are welded underneath bracket 152 as indicated in FIG. 14 and, also, at various points along the reinforcement C-section channels immediately adjacent element 56. The result, as best seen in FIG. 14, is to provide reinforcement to the front ends of inner load supporting beams 62 and 64 for the application of a towing force by means of towing hitch 66 attached to plates 132 and V-section connecting elements 136 by means of conventional bolts. The reinforcement elements attached to the load-supporting inner beams will, upon delivery of the mobile home, remain permanently attached within the floor frame assembly. Only the towing hitch 66 and associated bolts, washers and nuts will be detached from the floor frame assembly for reuse.

Figure 20:
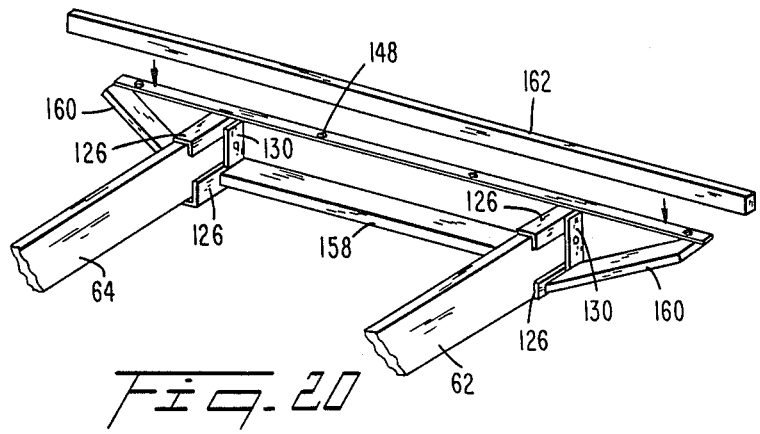
FIG. 20 is a partial perspective view of an end portion of a floor frame assembly according to this invention.

As best seen in FIG. 20, flat rectangular boards 158 and 160 are connected to the lower portions of the end reinforcement 126 and, at their outermost ends, to end member 56. The provision of such wooden pieces 158 and 160 facilitates attachment thereto, in the underneath regions of the floor frame assembly, of thin sheet-like covering material (described more fully hereinafter) to exclude dirt, moisture, insects and pests and to define a space within which may be located assorted useful elements such as heating and ventilating ducts, piping, wiring and/or thermal insulation, often most conveniently within rectangular apertures 100 in trusses 72, 74, 76 or 78.

Figure 21:
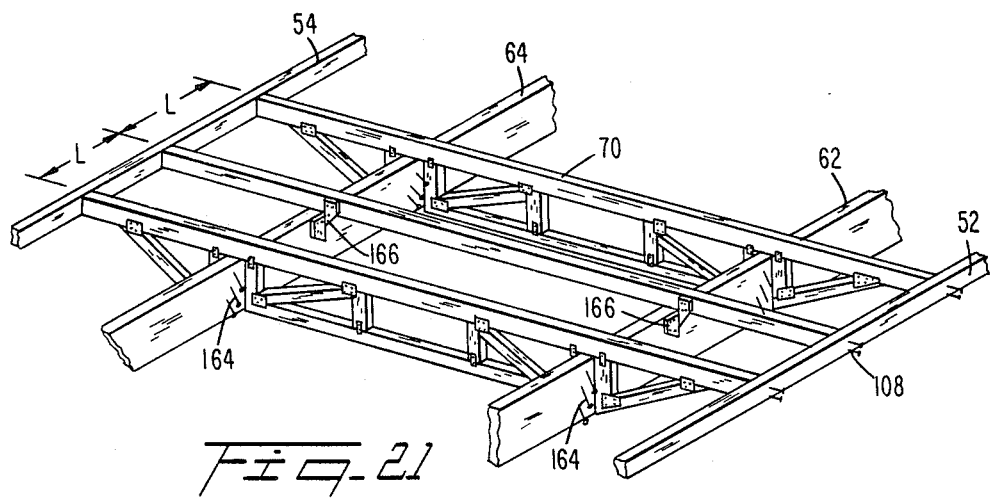
FIG. 21 is a partial perspective view of a portion of the assembly according to this invention, illustrating a preferred manner of connecting transverse elongate load-supporting members between trusses in the floor frame assembly according to this invention.

As mentioned earlier, under certain circumstances it is desirable to provide transverse 2"×4" wood elements 162 interspersed between adjacent trusses to provide additional support under the floor without necessarily adding much to the weight of the overall structure. Attachment between such transverse members 162 and load-supporting inner wooden beams 62 and 64 is advantageously effected with use of transverse member connecting brackets 166 that have two faces 168 and 170 normal to each other, each such face being provided with a plurality of apertures 172 for driving in nails or screws therethrough. The use of such brackets 166 is best understood with reference to FIG. 21. As previously indicated, center-to-center spacing between adjacent trusses and such transverse members 162, i.e., "1", may be set at sixteen inches.

Figure 23:
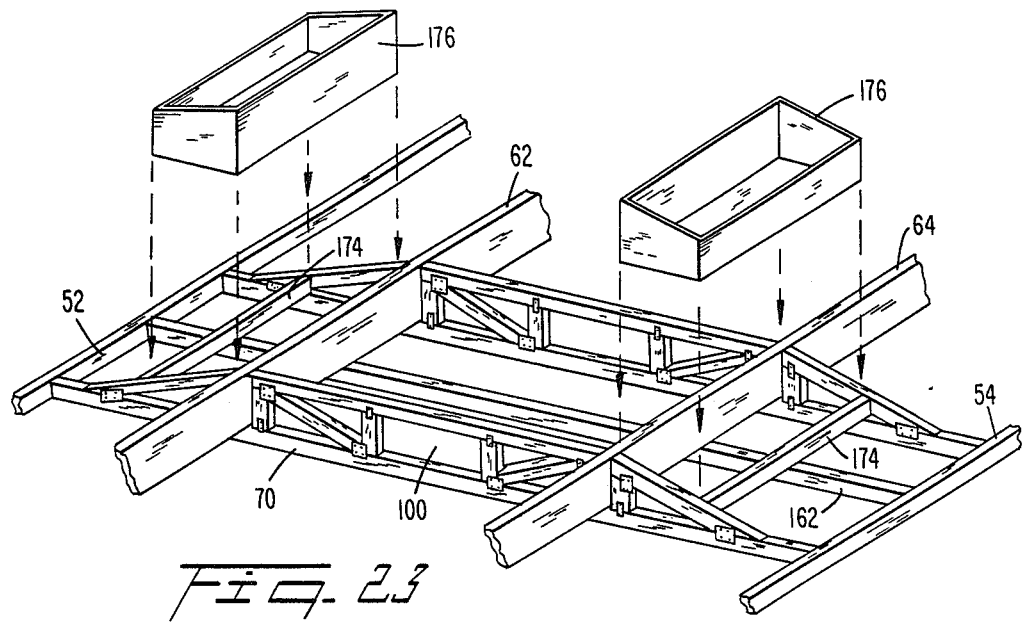
FIG. 23 is a partial perspective view of the underside of the floor frame assembly according to a preferred embodiment of the invention in a region where loading bearing wheels are to be located.

Depending on the size of the floor frame assembly and the weight of the assembly and any superstructure built thereon prior to transportation, it may be convenient to provide casings 176 to be located directly above individual wheels so that moisture, gravel and the like splattered by rolling action of the wheels on the highway will not deleteriously effect the lower portion of the floor frame assembly. Such casings 176 may conveniently have the form of an open box for the open face cut on a slant at an angle "$\theta$" to the horizontal so as to match the angles at which elements 86 or 90 of trusses 70 or 72, respectively, are disposed. Casings 176 may most conveniently be made of a moisture resistant, tough material such as fiberglass, sheet aluminum or the like and may be nailed or screwed into place to the underside of the top pieces 82 or transverse 2"×4" support elements 162 as well as to longitudinally oriented wooden bracing pieces 174, as best seen in FIG. 23.

Figures 22, 24, 25:
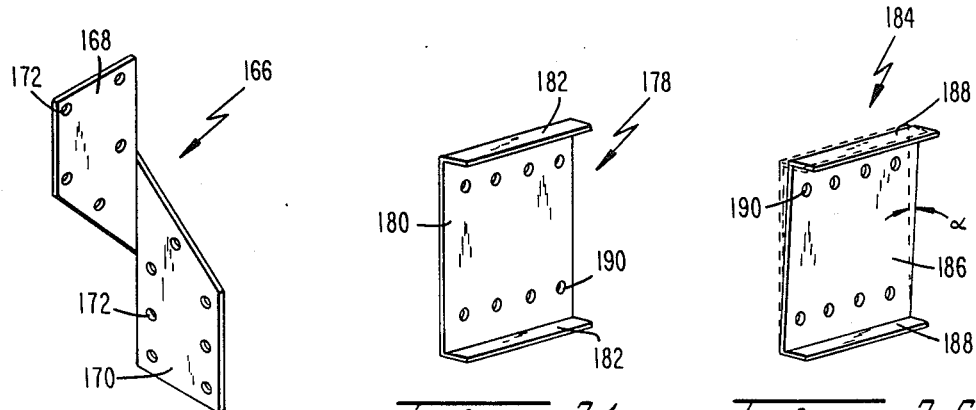
FIG. 22 is a perspective illustration of a bracket suitable for use in the structure illustrated in FIG. 21.
FIGS. 24 and 25 are perspective illustrations of weldable steel metal segments that combine to form a beam splice for butt-splicing longitudinal sections of load bearing interior beams.
Figure 26:
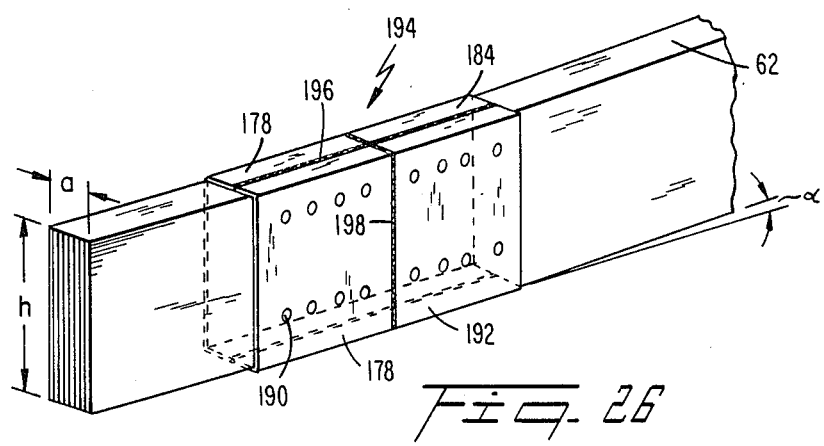
FIG. 26 is a perspective view of a beam splicing element formed of the elements illustrated in FIGS. 24 and 25 to butt-splice two elongate sections of a load-bearing interior beam with a predetermined camber.

As will be understood by persons skilled in the art, transportation of floor frame assembly 50 or, more particularly, a complete mobile home built on such a floor frame assembly, is bound to encounter incidental inertial or shock loads due to unevenness of the roadway. Where the mobile home unit is particularly long, e.g., greater than forty feet in length, where the road surface is uneven, these forces can be harmful to the integrity of the unit being transported. An advantageous solution realized very simply in this invention is to utilize generally C-section weldable steel metal elements such as 178 and 184, best seen in FIGS. 24 and 25, respectively, that are sized and shaped to fit snugly about the ends of two elongate beam lengths placed end-to-end. Thus, the vertical internal dimension of the largest faces 180 and 186 of elements 178 and 184, respectively, is "h" and the lateral or transverse dimensions of extensions 182 and 188 thereof are each not greater than one-half the thickness "a" of the typical beam elements 162 contained therewithin. By means of a suitable jig or otherwise, two elongate beam segments of a typical wooden interior support beam 62 are placed end-to-end, and one pair each of elements 178 and 184 are placed at the junction as indicated in FIG. 26 and weld seams 196 and 198 are formed. This results in a closely fitted beam splice element 194 being formed with a plurality of apertures 190 through which holes can be drilled into the wood beams contained therewithin for bolting thereof to create a butt-splice. Of particular importance in connection with strengthening the floor frame assembly to accommodate transient loads encountered during transportation is to form the largest face 186 of element 184 as a parallelogram rather than a rectangle, with generally upright sides being inclined at a small angle "$\alpha$" with the true vertical. As a consequence, the beam splice element 194, when bolted firmly to the wood beam elements contained therewithin, will create a long beam cambered upward in a vertical plane at the predetermined small angle "$\alpha$". If one of the beam elements is principally supported by a plurality of wheels, and the other portion extends forwardly thereof to towing hitch 66, cambering of the beams in vertical planes, particularly when the weight of superstructure mounted thereon essentially straightens out the beams, provides a prestressed and hence more rigid floor frame assembly. Persons skilled in the art will appreciate that the counterpart to element 184 will be the mirror image thereof (although this is not shown for the sake of simplicity).

As persons skilled in the art will immediately appreciate, where the load-supporting inner beams 62 and 64 are further reinforced along their lengths by the application of C-section channels 126 connected by crisscross lengths of steel rod 128 (as best seen with reference to FIGS. 3 and 4), lengths of C-section channel 126 on either side of beam splicing element 194 may also to welded thereto. This is best understood with reference to splice element 194 as illustrated in FIGS. 3 and 4. The consequence of doing this is to generate a relatively light but extremely strong interior load bearing beam that starts out at a small camber characterized by angle "$\alpha$", typically sufficient to generate a typical camber in an unloaded beam of five inches in a twenty foot length from the beam splice element, which practice provides a floor frame assembly that strongly resists sagging during transportation.

FIG. 27 illustrates an exemplary understructure welded onto lower C-section channel elements reinforcing load-supporting inner beams 62 and 64. In this structure, instead of crisscrossing relatively thin bar elements 128, rectangular weldable metal elements 130 are welded between C-section channels 126 on opposite sides of the within contained load-supporting inner wooden beam 62 or 64. To the underside of the frame assembly, by welding, are attached assemblies of short C-section channel lengths 202, rectangular plates 132, lengths of C-section wheel attachment brackets 204, and transversely disposed paired pieces of L-section lengths 208.

It should be noted in FIG. 27 that the paired flat rectangular elements 132 are utilized adjacent each other and connected to each other by a plurality of adjustable threaded bolt elements 133. This enables adjustment in the vertical direction when wheel axle assemblies are mounted to aperture 206 in the C-section elements 204 furthest from the attached reinforcement C-section channel lengths 126. Thus, any tendency of the structure to warp and load different wheel to different extent can be countered, within reason, by adjustment of adjustment bolts 133.

As persons skilled in the art will immediately appreciate, standard wheel assemblies (not illustrated separately but as indicated in FIG. 1) mounted on conventional leaf springs or the like, with or without shock absorber elements, can be readily mounted to apertures 206, as best seen in FIG. 27. Upon delivery of the floor frame assembly 50 or a complete mobile home structure to its intended location, whereafter it will be supported by static supports to the ground, the transport wheel assembly can be detached for subsequent reuse. The structure illustrated in FIG. 27, then, would remain as an integral part of the floor frame assembly.

FIG. 28 is a perspective view of the towing hitch 66. This is conveniently constituted of two lengths of I-section beam 210 connected to form a V-shape spaced laterally by C-section lengths 212 welded thereto, preferably on an upper surface. At the apex of the V is attached a conventional portion 214 for connection with a towing vehicle. Also at the apex of the V-shape is provided an internally threaded aperture (not numbered) through which a threaded jack leg 216 can be turned by a crank 218 to raise or lower the towing hitch with respect to the ground. A plurality of rectangular metal elements 132, as described hereinbefore, are welded to the upper surface of the two V-connected I-beam lengths and the apertures therethrough are utilized to bolt on hitch 66 underneath portions at the front of the floor frame assembly. Upon delivery of the floor frame assembly 50 or a complete mobile home to its intended location, the towing hitch 60 can be detached therefrom for reuse.

As previously mentioned, a thin, generally flat sheetlike covering element, conveniently obtained in a roll 220, can be stretched out and attached to the underneath portions of the various load carrying beams and lower portions of trusses therebetween as expanse 222, best seen in FIG. 29. Because the direct connection of such a thin sheet of covering material by nails or screws is often impractical, it is most convenient to utilize flat wooden blocks 224 and a plurality of nails 226 to sandwich the covering sheet between beams or trusses and blocks 224. Also, as seen in FIG. 29, various elongate elements such as, for example, water or gas pipes 228, may be enclosed within and through the various trusses, particularly the central rectangular portions 100 thereof. Heating and ventilating ducts, wiring, and thermal insulation may also be enclosed so that the complete structure is a unified floor frame assembly with major utility elements conveniently, included at the point of manufacture of the floor frame assembly rather than by later work close to the ground once the unit is delivered to its permanent location. As persons skilled in the art will immediately appreciate, provision may be made in the flooring (not numbered) to overlay the floor of the structure described hitherto to accommodate heating vents and the like.

In actual use, unlike presently available mobile home floor frame assemblies that require the building of continuous walls or the provision of support beams underneath the periphery of the floor frame assembly, various embodiments disclosed herein each provide the convenience and facility of being supportable at selected location under the outer and inner load supporting beams. The ultimate user, however, can advantageously use a complete peripheral wall upon which to rest the floor frame assembly 50. If desired, conventional load-supporting piers or jackposts can also be provided at various locations underneath load-supporting inner beams 62 and 64, or conventional I-section beams 102 as appropriate. It will also be apparent to those skilled in the art that the floor frame assembly 50 according to the present invention can be tied down at any point along its outer or inner load-supporting beams and/or truss members as desired. This may be highly appropriate and desirable in regions where strong winds may be encountered. Basically the same considerations apply when two such floor frame assemblies, constructed per FIG. 4, are assembled to form a composite unit.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A unified floor frame assembly suitable for a mobile home, comprising:
    first and second elongate load-supporting outer beams disposed parallel to and on opposite sides of a longitudinal axis of the floor frame assembly, each outer beam having respective front and rear ends;
    front and rear end members respectively connected perpendicular to said axis at said front and rear ends of said outer beams, defining therewith a perimeter of said floor frame assembly, said perimeter having vertical inner and outer perimeter surfaces substantially defined by corresponding inner and outer surfaces of said outer beams and said end members;
    a plurality of truss means normal to said outer beams and connected to said inner perimeter surface thereat, at predetermined separations between said end members, each said truss means being formed to include an upper elongate member and a central lower elongate member connected parallel thereto by a plurality of vertical members and cross bracing elements and two additional braced vertical members separated from said central member to define at the ends of said central member two vertical gaps, each of a predetermined height and width, at least one end portion of each of said upper elongate members having a cantilever form suitable for load-supporting contact thereat with an outer load-supporting surface where said floor frame assembly is to be located;
    first and second elongate load-supporting inner beams individually disposed in a close fit within said two gaps in said plurality of truss means so as to be oriented parallel to and on opposite sides of said axis and connected at respective front and rear ends to said front and rear end members;
    a plurality of connector means for securely connecting said inner beams to said trusses, whereby a rigid framework contained with said outer perimeter is formed to support floor means and superstructure thereon;
    floor means disposed substantially across the expanse defined by said perimeter and securely connected atop said outer beams, said end members and said plurality of truss means; and
    wheel and towing hitch connector means attached under said inner beams for connecting in known manner with temporarily attachable load-supporting wheel means and hitch means to enable towed transportation of the floor frame assembly thereby.

2. The floor frame assembly of claim 1, wherein:
    one of said first and second outer beams has a larger vertical cross-sectional dimension than the other, and each of said trusses at the end thereof connecting to the larger sectional outer beam there has correspondingly sized vertically depending braced element for making said connection.

3. The floor frame assembly of claim 1, further comprising:
    bottom covering means comprising a thin sheet-like element disposed substantially across a lower expanse of the floor assembly for covering the same to exclude moisture, dirt, insects and pests.

4. The floor frame assembly of claim 1, wherein:
    each of said trusses is geometrically symmetric about said axis and has both ends in said cantilever form, said first and second outer beams have mutually similar geometry, said inner beams have mutually similar geometry but a larger vertical cross-sectional dimension than the outer beams, and all of the inner and outer beams are constituted essentially of wood material.

5. The floor frame assembly of claim 4, wherein: said inner beams are formed of I-section steel lengths.

6. The floor frame assembly of claim 5, wherein: said connector means comprise short lengths of C-section channel welded to said I-section steel inner beams to closely receive and attach by known means to correspondingly disposed portions of said upper elongate members of said trusses.

7. The floor frame assembly of claim 6, wherein: said connector means further comprises bottom connector elements that include two C-section end portions formed to closely fit and attach to said trusses at lower portions on both sides of said gaps thereof and a flat portion between said C-section end portions contiguous with the bases of said C-section end portions, such that said flat portion is weldable to an underneath portion of the I-section steel inner beams, whereby the bottom portions of said trusses are respectively securely connected to said inner beams.

8. The floor frame assembly of claim 4, further comprising:
longitudinally disposed reinforcement means fitted to selected portions of the inner beams for providing supplemental rigidity thereto, the widths of said vertical gaps in a portion of said plurality of trusses being individually selected as necessary to accommodate in a close fit the width of said reinforcement means fitted to said inner beams.

9. The floor frame assembly of claim 8, wherein: said reinforcement means comprises lengths of C-section channel, closely fitted to receive the top and bottom portions of said inner beams therewith.

10. The floor frame assembly of claim 9, wherein: said C-section channel lengths fitted to corresponding top and bottom portions of each inner beam are permanently connected to each other by reinforcement bracing.

11. The floor frame assembly of claim 10, wherein: said C-section channel lengths and said reinforcement bracing comprise weldable metal and said permanent connection is obtained by welding therebetween.

12. The floor frame assembly of claim 11, wherein: said inner beams each comprise a plurality of coplanar elongate segments butt-spliced at their respective adjacent ends by means for splicing said segments by firm attachment thereto;
said splicing means comprises weldable metal splicing segments assembled to simultaneously overlap a length of each of said pair of adjacent coplanar beam segments, said splicing segments being welded together to form a separate closely fitted sleeve portion around a respective length of each of the spliced adjacent segments enclosed therein, said sleeve portions and the enclosed beam segments being permanently attached by means for attaching the same; and
the splicing segments are formed such that the welding thereof causes the beam segments spliced thereby to be spliced at an obtuse angle with respect to each other instead of being collinear in their common plane.

13. The floor frame assembly of claim 11, further comprising:
a plurality of transverse elongate floor supporting elements, essentially similar to said upper elongate member of said truss means, interspersed and in parallel with said truss means to connect with and support said floor mounted thereto.

14. The floor frame assembly of claim 1, wherein: said inner beams each comprise a plurality of coplanar elongate segments butt-spliced at their respective adjacent ends by means for splicing said segments by firm attachment thereto.

15. The floor frame assembly of claim 14, further comprising:
a plurality of transverse elongate floor supporting elements, essentially similar to said upper elongate member of said truss means, interspersed and in parallel with said truss means to connect with and support said floor mounted thereto.

16. The floor frame assembly of claim 14, wherein: said splicing means comprises weldable metal splicing segments assembled to simultaneously overlap a length of each of said pair of adjacent coplanar beam segments, said splicing segments being welded together to form a separate closely fitting sleeve portion around a respective length of each of the spliced adjacent segments enclosed therein, said sleeve portions and the enclosed beam segments being permanently attached by means for attaching the same.

17. The floor frame assembly of claim 16, further comprising:
a plurality of transverse elongate floor supporting elements, essentially similar to said upper elongate member of said truss means, interspersed and in parallel with said truss means to connect with and support said floor mounted thereto.

18. The floor frame assembly of claim 16, wherein: the splicing segments are formed such that the welding thereof causes the beam segments spliced thereby to be spliced at an obtuse angle with respect to each other instead of being collinear in their common plane.

19. The floor frame assembly of claim 18, further comprising:
a plurality of transverse elongate floor supporting elements, essentially similar to said upper elongate member of said truss means, interspersed and in parallel with said truss means to connect with and support said floor mounted thereto.

20. The floor frame assembly of claim 19, wherein: said C-section channel lengths are welded to said splicing segments so as to a predetermined reinforced cambering of said spliced inner beams.

21. A unified floor frame, suitable for assembly into a floor for a mobile home, comprising:
first and second elongate load-supporting outer beams disposed parallel to and on opposite sides of a longitudinal axis of the floor frame, each outer beam having respective front and rear ends;
front and rear end members respectively connected perpendicular to said axis at said front and rear ends of said outer beams, defining therewith a perimeter of said floor frame, said perimeter having vertical inner and outer perimeter surfaces substantially defined by corresponding inner and outer surfaces of said outer beams and said end members;

a plurality of truss means normal to said outer beams and connected to said inner perimeter surface thereat, at predetermined separations between said end members, each said truss means being formed to include an upper elongate member and a central lower elongate member connected parallel thereto by a plurality of vertical members and cross bracing elements and two additional braced vertical members separated from said central member to define at the ends of said central member two vertical gaps, each of a predetermined height and width, at least one end portion of each of said upper elongate members having a cantilever form suitable for load-supporting contact thereat with an outer load-supporting surface where said floor frame is to be located for use;

first and second elongate load-supporting inner beams individually disposed in a close fit within said two gaps in said plurality of truss means so as to be oriented parallel to and on opposite sides of said axis and connected at respective front and rear ends to said front and rear end members; and a plurality of connector means for securely connecting said inner beams to said trusses, whereby a rigid framework contained with said outer perimeter is formed to support a floor means and any related superstructure thereon.

22. The floor frame of claim 21, wherein:
one of said first and second outer beams has a larger vertical cross-sectional dimension than the other, and each of said trusses at the end thereof connecting to the larger sectional outer beam there has a correspondingly sized vertically depending braced element for making said connection.

23. The floor frame of claim 21, further comprising:
bottom covering means comprising a thin sheet-like element disposed substantially across a lower expanse of the floor frame for covering the same to exclude moisture, dirt, insects and pests.

24. The floor frame of claim 21, wherein:
each of said trusses is geometrically symmetric about said axis and has both ends in said cantilever form, said first and second outer beams have mutually similar geometry, said inner beams have mutually similar geometry but a larger vertical cross-sectional dimension than the outer beams, and all of the inner and outer beams are constituted essentially of wood material.

25. The floor frame claim 24, further comprising:
longitudinally disposed reinforcement means fitted to selected portions of the inner beams for providing supplemental rigidity thereto, the widths of said vertical gaps in a portion of said plurality of trusses being individually selected as necessary to accommodate in a close fit the width of said reinforcement means fitted to said inner beams.

26. The floor frame of claim 25, wherein:
said reinforcement means comprises lengths of C-section channel, closely fitted to receive the top and bottom portions of said inner beams therewithin.

27. The floor frame of claim 26, wherein:
said C-section channel lengths fitted to corresponding top and bottom portions of each inner beam are permanently connected to each other by reinforcement bracing.

28. The floor frame of claim 27, wherein:
said C-section channel lengths and said reinforcement bracing comprise weldable metal and said permanent connection is obtained by welding therebetween.

29. The floor frame of claim 28, wherein:
said inner beams each comprise a plurality of coplanar elongate segments butt-spliced at their respective adjacent ends by means for splicing said segments by firm attachment thereto;
said splicing means comprises weldable metal splicing segments assembled to simultaneously overlap a length of each of said pair of adjacent coplanar beam segments, said splicing segments being welded together to form a separate closely fitting sleeve portion around a respective length of each of the spliced adjacent segments enclosed therein, said sleeve portions and the enclosed beam segments being permanently attached by means for attaching the same; and
the splicing segments are formed such that the welding thereof causes the beam segments spliced thereby to be spliced at an obtuse angle with respect to each other instead of being collinear in their common plane.

30. The floor frame of claim 28, further comprising:
a plurality of transverse elongate floor supporting elements, essentially similar to said upper elongate member of said truss means, interspersed and in parallel with said truss means to connect with and support a floor mounted thereto.

31. The floor frame of claim 21, wherein:
said inner beams each comprise a plurality of coplanar elongate segments butt-spliced at their respective adjacent ends by means for splicing said segments by firm attachment thereto.

32. The floor frame of claim 31, further comprising:
a plurality of transverse elongate floor supporting elements, essentially similar to said upper elongate member of said truss means, interspersed and in parallel with said truss means to connect with and support a floor mounted thereto.

33. The floor frame of claim 31, wherein:
said splicing means comprises weldable metal splicing segments assembled to simultaneously overlap a length of each of said pair of adjacent coplanar beam segments, said splicing segments being welded together to form a separate closely fitting sleeve portion around a respective length of each of the spliced adjacent segments enclosed therein, said sleeve portions and the enclosed beam segments being permanently attached by means for attaching the same.

34. The floor frame of claim 33, wherein:
the splicing segments are formed such that the welding thereof causes the beam segments spliced thereby to be spliced at an obtuse angle with respect to each other instead of being collinear in their common plane.

35. The floor frame of claim 34, further comprising:
a plurality of transverse elongate floor supporting elements, essentially similar to said upper elongate member of said truss means, interspersed and in parallel with said truss means to connect with and support said floor mounted thereto.

36. The floor frame of claim 35, wherein:
said C-section channel lengths are welded to said splicing segments so as to generate a predetermined reinforced cambering of said spliced inner beams.

37. The floor frame of claim 33, further comprising:

a plurality of transverse elongate floor supporting elements, essentially similar to said upper elongate member of said truss means, interspersed and in parallel with said truss means to connect with and support a floor mounted thereto.

38. The floor frame of claim 24, wherein:

said inner beams are formed of I-section steel lengths.

39. The floor frame of claim 38, wherein:

said connector means comprise short lengths of C-section channel welded to said I-section steel inner beams to closely receive and attach by known means to correspondingly disposed portions of said upper elongate members of said trusses.

40. The floor frame of claim 39, wherein:

said connector means further comprises bottom connector elements that include two C-section end portions formed to closely fit and attach to said trusses at lower portions on both sides of said gaps thereof and a flat portion between said C-section end portions contiguous with the bases of said C-section end portions, such that said flat portion is weldable to an underneath portion of the I-section steel inner beams, whereby the bottom portions of said trusses are respectively securely connected to said inner beams.

41. An elongate reinforced beam comprising a plurality of lengthwise connected wood beam segments, suitable for supporting a substantial load transversely of the beam length, comprising:

a plurality of elongate wood beam segments;

means for butt-splicing the respective adjacent ends of two of said wood beam segments, comprising weldable metal splicing segments assembled to simultaneously overlap a length of each of said two wood beam segments, said splicing segments being welded together to form a separate closely fitting sleeve portion around a respective length of each of the spliced adjacent wood beam segments enclosed therein, said sleeve portions and the enclosed beam segments being permanently attached by means for attaching the same; and longitudinally disposed weldable metal reinforcement means fitted to selected lengthwise portions of the wood beam segments to provide supplemental rigidity thereto.

42. The reinforced beam of claim 41, wherein:

said reinforcement means comprises lengths of C-section channel, closely fitted to receive top and bottom portions of said wood beam segments therewithin.

43. The reinforced beam of claim 42, wherein:

said C-section channel lengths fitted to corresponding top and bottom portions of each wood beam segment are permanently connected to each other by reinforcement bracing.

44. The reinforced beam of claim 43, wherein:

said C-section channel lengths and said reinforcement bracing comprise weldable metal and said permanent connection is obtained by welding therebetween.

45. The reinforced beam of claim 41, wherein:

the splicing segments are formed such that the welding thereof causes the beam segments spliced thereby to be spliced at an obtuse angle with respect to each other instead of being collinear in their common plane.

46. A truss suitable for assembly into a floor frame for a mobile home that has elongate inner load-supporting beams disposed longitudinally, comprising:

an upper elongate member;

a central elongate member, shorter than the upper elongate member and connected parallel thereto by a plurality of members perpendicular thereto and by cross-bracing elements connected to brace the perpendicular members to the elongate members;

two additional outer perpendicular members separated from the respective ends of the central member to define on each side thereof a gap of a predetermined height and width, such that at least one of the end portions of the upper elongate member has a cantilever form suitable for load-supporting contact thereat with an external support, each said gap being sized to receive closely therein an elongate load-supporting beam.

47. A truss according to claim 45, further comprising:

outer bracing members bracing the outer perpendicular members to the upper elongate member.

48. A truss according to claim 45, further comprising:

an end perpendicular member connected at one end of the upper elongate member to be perpendicular thereto and braced by an outer bracing member to an adjacent one of the outer perpendicular members.

* * * * *